United States Patent
Jin et al.

(10) Patent No.: US 10,389,559 B2
(45) Date of Patent: Aug. 20, 2019

(54) REFERENCE SIGNAL SENDING METHOD, REFERENCE SIGNAL RECEIVING METHOD, AND APPARATUS

(71) Applicant: HUAWEI TECHNOLOGIES CO., LTD., Shenzhen, Guangdong (CN)

(72) Inventors: Zhe Jin, Beijing (CN); Zhe Chen, Shenzhen (CN); Weiliang Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 15/730,136

(22) Filed: Oct. 11, 2017

(65) Prior Publication Data

US 2018/0034673 A1 Feb. 1, 2018

Related U.S. Application Data

(63) Continuation of application No. PCT/CN2015/076593, filed on Apr. 15, 2015.

(51) Int. Cl.
*H04L 5/00* (2006.01)
*H04W 4/20* (2018.01)
(Continued)

(52) U.S. Cl.
CPC ........ *H04L 27/2017* (2013.01); *H04L 5/0048* (2013.01); *H04L 25/0202* (2013.01);
(Continued)

(58) Field of Classification Search
CPC . H04L 25/0202; H04L 27/01; H04L 27/2017; H04L 27/22; H04L 27/261; G06F 11/10
See application file for complete search history.

(56) References Cited

U.S. PATENT DOCUMENTS 4,742,514 A * 5/1988 Goode ..................... H04B 1/66
370/280
5,027,352 A * 6/1991 Goode ................. H04L 27/142
370/345

(Continued)

FOREIGN PATENT DOCUMENTS

CN 1273462 A 11/2000
CN 1384675 A 11/2002
(Continued)

OTHER PUBLICATIONS

3GPP TS 45.002, "$3^{rd}$ Generation Partnership Project; Technical Specification Group GSM/EDGE Radio Access Network; Multiplexing and multiple access on the radio path (Release 12)" Mar. 2015, XP51294166A, 120 pgs.

(Continued)

*Primary Examiner* — Khanh C Tran
(74) *Attorney, Agent, or Firm* — Staas & Halsey LLP

(57) ABSTRACT

Embodiments of the present invention provide a reference signal sending method, a reference signal receiving method, and an apparatus. A reference signal sending method includes: obtaining a reference signal sequence, where the reference signal sequence includes multiple bits and exclusive OR of every two bits separated by one bit in the multiple bits is 1; performing Gaussian Minimum Shift Keying GMSK modulation on the reference signal sequence; and sending a modulated reference signal sequence. In the embodiments of the present invention, a reference signal sequence is designed as a sequence in which exclusive OR of every two bits separated by one bit is 1, GMSK modulation is performed on the reference signal sequence, and the same reference signal sequence is used to perform channel estimation during GMSK demodulation. Compared with a (Continued)

case in which a pseudo random sequence is used as a pilot symbol, channel estimation accuracy is improved.

17 Claims, 3 Drawing Sheets

(51) Int. Cl.
| | |
|---|---|
| *H04L 25/02* | (2006.01) |
| *H04L 27/20* | (2006.01) |
| *H04L 27/26* | (2006.01) |
| *H04L 27/01* | (2006.01) |
| *H04L 27/22* | (2006.01) |
| *H04L 27/148* | (2006.01) |

(52) U.S. Cl.
CPC ............ *H04L 27/261* (2013.01); *H04W 4/20* (2013.01); *H04L 27/01* (2013.01); *H04L 27/148* (2013.01); *H04L 27/22* (2013.01)

(56) References Cited

U.S. PATENT DOCUMENTS

| | | | |
|---|---|---|---|
| 5,146,457 A * | 9/1992 | Veldhuis | .......... G11B 20/00007 370/477 |
| 5,151,925 A | 9/1992 | Gelin et al. | |
| 5,103,459 A | 7/1999 | Gilhousen et al. | |
| 2002/0089440 A1* | 7/2002 | Kranz | ................... H03M 1/745 341/143 |
| 2008/0069265 A1 | 3/2008 | Ludvigsen | |
| 2009/0102687 A1* | 4/2009 | Furman | ................ H04L 1/0059 341/106 |
| 2009/0196271 A1 | 8/2009 | Song | |

FOREIGN PATENT DOCUMENTS

| | | |
|---|---|---|
| CN | 103490824 A | 1/2014 |
| CN | 104333525 A | 2/2015 |
| EP | 0349064 B1 | 1/1990 |

OTHER PUBLICATIONS

Extended European Search Report dated Jan. 19, 2018 in corresponding European Patent Application No. 15888785.1, 12 pgs.
International Search Report dated Jan. 20, 2016 in corresponding International Patent Application No. PCT/CN2015/076593.
Chinese Office Action dated May 15, 2019 in corresponding Chinese Patent Application No. 201580078560.1 (10 pates).

* cited by examiner

REFERENCE SIGNAL SENDING METHOD, REFERENCE SIGNAL RECEIVING METHOD, AND APPARATUS

CROSS-REFERENCE TO RELATED APPLICATION

This application is a continuation of International Application No. PCT/CN2015/076593, filed on Apr. 15, 2015, the disclosure of which is hereby incorporated by reference in its entirety.

TECHNICAL FIELD

Embodiments of the present invention relate to the field of communications technologies, and in particular, to a reference signal sending method, a reference signal receiving method, and an apparatus.

BACKGROUND

As a constant envelope consecutive phase modulation technology, Gaussian Minimum Shift Keying (Gaussian Filtered Minimum Shift Keying, GMSK for short) is widely applied in a Global system for mobile communications (Global System for Mobile Communication, GSM for short).

FIG. 1 is a schematic diagram of a sending principle of a GMSK transmitter. Pilot symbols are inserted before data symbols, or pilot symbols are inserted into data symbols at equal intervals. The pilot symbols are a pseudo random sequence generated by means of pseudo random, and differential coding and GMSK modulation are performed on the data symbols into which the pilot symbols are inserted, to obtain a GMSK modulation signal. FIG. 2 is a schematic diagram of a receiving principle of a GMSK receiver. Matched filtering is performed on a GMSK modulation signal to obtain a data receiving signal and a pilot receiving signal. Channel estimation is performed according to the pilot receiving signal and a pilot symbol that is stored locally in the GMSK receiver and that is consistent with a pilot symbol on a GMSK transmitter side, to estimate a channel coefficient. Equalization processing is performed by using the channel coefficient and the data receiving signal to obtain a data estimation symbol, that is, a data symbol restored by the GMSK receiver.

However, using a pseudo random sequence as a pilot symbol on the GMSK transmitter and the GMSK receiver affects channel estimation accuracy, and causes poor channel estimation performance.

SUMMARY

Embodiments of the present invention provide a reference signal sending method, a reference signal receiving method, and an apparatus, to improve channel estimation accuracy and channel estimation performance.

According to a first aspect, a reference signal sending method is provided, where the method includes:

obtaining a reference signal sequence, where the reference signal sequence includes multiple bits and exclusive OR of every two bits separated by one bit in the multiple bits is 1;

performing Gaussian Minimum Shift Keying GMSK modulation on the reference signal sequence; and sending a modulated reference signal sequence.

With reference to the first aspect, in a first possible implementation of the first aspect, the reference signal sequence is at least one of the following sequences: a first reference signal sequence, a second reference signal sequence, a third reference signal sequence, or a fourth reference signal sequence, where the first reference signal sequence is a periodic sequence of a sequence 0, 0, 1, 1, the second reference signal sequence is a periodic sequence of a sequence 0, 1, 1, 0, the third reference signal sequence is a periodic sequence of a sequence 1, 0, 0, 1, and the fourth reference signal sequence is a periodic sequence of a sequence 1, 1, 0, 0.

With reference to the first possible implementation of the first aspect, in a second possible implementation of the first aspect, the performing Gaussian Minimum Shift Keying GMSK modulation on the reference signal sequence includes:

inserting the reference signal sequence into a data bit; and performing GMSK modulation on the data bit into which the reference signal sequence is inserted.

With reference to the second possible implementation of the first aspect, in a third possible implementation of the first aspect, before the obtaining a reference signal sequence, the method further includes: obtaining a pseudo random bit sequence; and the obtaining a reference signal sequence includes:

obtaining N consecutive bits of the pseudo random bit sequence; and obtaining a sequence that is identified by the N consecutive bits from the first reference signal sequence, the second reference signal sequence, the third reference signal sequence, and the fourth reference signal sequence, where N is greater than or equal to 1.

With reference to the second possible implementation of the first aspect or the third possible implementation of the first aspect, in a fourth possible implementation of the first aspect, the obtaining a reference signal sequence includes: obtaining multiple reference signal sequences; and the inserting the reference signal sequence into a data bit includes: separately inserting the multiple reference signal sequences into the data bit.

With reference to the fourth possible implementation of the first aspect, in a fifth possible implementation of the first aspect, the obtaining a pseudo random bit sequence includes:

obtaining the pseudo random bit sequence according to an initialization seed, where the initialization seed is an initialization seed that a communications peer end uses in a channel estimation process.

With reference to the second possible implementation of the first aspect, in a sixth possible implementation of the first aspect, before the obtaining a reference signal sequence, the method further includes: receiving an identifier of the reference signal sequence; and the obtaining a reference signal sequence includes: obtaining the reference signal sequence identified by the identifier of the reference signal sequence.

With reference to the second possible implementation of the first aspect or the sixth possible implementation of the first aspect, in a seventh possible implementation of the first aspect, the inserting the reference signal sequence into a data bit includes:

segmenting the reference signal sequence to obtain multiple reference signal sequence segments; and separately inserting the multiple reference signal sequence segments into the data bit.

According to a second aspect, a reference signal receiving method is provided, where the method includes:

receiving a modulated reference signal sequence;

demodulating the modulated reference signal sequence to obtain a reference signal sequence; and performing channel estimation by using the reference signal sequence and a local reference signal sequence to obtain channel parameter information, where the local reference signal sequence includes multiple bits and exclusive OR of every two bits separated by one bit in the multiple bits is 1.

With reference to the second aspect, in a first possible implementation of the second aspect, the local reference signal sequence is at least one of the following sequences: a first reference signal sequence, a second reference signal sequence, a third reference signal sequence, or a fourth reference signal sequence, where the first reference signal sequence is a periodic sequence of a sequence 0, 0, 1, 1, the second reference signal sequence is a periodic sequence of a sequence 0, 1, 1, 0, the third reference signal sequence is a periodic sequence of a sequence 1, 0, 0, 1, and the fourth reference signal sequence is a periodic sequence of a sequence 1, 1, 0, 0.

With reference to the first possible implementation of the second aspect, in a second possible implementation of the second aspect, before the performing channel estimation by using the reference signal sequence and a local reference signal sequence to obtain channel parameter information, the method further includes: generating the local reference signal sequence.

With reference to the second possible implementation of the second aspect, in a third possible implementation of the second aspect, before the generating the local reference signal sequence, the method further includes: generating a pseudo random bit sequence; and the generating the local reference signal sequence includes:

obtaining N consecutive bits of the pseudo random bit sequence; and obtaining a sequence that is identified by the N consecutive bits from the first reference signal sequence, the second reference signal sequence, the third reference signal sequence, and the fourth reference signal sequence as the local reference signal sequence, where N is greater than or equal to 1.

With reference to the third possible implementation of the second aspect, in a fourth possible implementation of the second aspect, before the generating the local reference signal sequence, the method further includes: generating a pseudo random bit sequence $C_k$, k≥0; and the generating the local reference signal sequence includes:

obtaining K groups of bits from the pseudo random bit sequence, where each group contains two consecutive bits; and obtaining a sequence that is identified by each group of bits among the K groups of bits from the first reference signal sequence, the second reference signal sequence, the third reference signal sequence, and the fourth reference signal sequence as the local reference signal sequence.

With reference to the third possible implementation of the second aspect or the fourth possible implementation of the second aspect, in a fifth possible implementation of the second aspect, the generating a pseudo random bit sequence includes:

generating the pseudo random bit sequence according to an initialization seed, where the initialization seed is an initialization seed that a communications peer end uses in a GMSK modulation process.

With reference to the first possible implementation of the second aspect, in a sixth possible implementation of the second aspect, the method further includes:

receiving an identifier of a reference signal sequence; and selecting a sequence that is identified by the identifier of the reference signal sequence from the first reference signal sequence, the second reference signal sequence, the third reference signal sequence, and the fourth reference signal sequence as the local reference signal sequence.

According to a third aspect, a transmit end device is provided, where the device includes:

a first processing unit, configured to obtain a reference signal sequence, where the reference signal sequence includes multiple bits and exclusive OR of every two bits separated by one bit in the multiple bits is 1, and perform Gaussian Minimum Shift Keying GMSK modulation on the reference signal sequence; and a first transceiver unit, configured to send a modulated reference signal sequence.

With reference to the third aspect, in a first possible implementation of the third aspect, the reference signal sequence is at least one of the following sequences: a first reference signal sequence, a second reference signal sequence, a third reference signal sequence, or a fourth reference signal sequence, where the first reference signal sequence is a periodic sequence of a sequence 0, 0, 1, 1, the second reference signal sequence is a periodic sequence of a sequence 0, 1, 1, 0, the third reference signal sequence is a periodic sequence of a sequence 1, 0, 0, 1, and the fourth reference signal sequence is a periodic sequence of a sequence 1, 1, 0, 0.

With reference to the first possible implementation of the third aspect, in a second possible implementation of the third aspect, the first processing unit is specifically configured to insert the reference signal sequence into a data bit, and perform GMSK modulation on the data bit into which the reference signal sequence is inserted.

With reference to the second possible implementation of the third aspect, in a third possible implementation of the third aspect, the first processing unit is further configured to obtain a pseudo random bit sequence, obtain N consecutive bits of the pseudo random bit sequence, and obtain a sequence that is identified by the N consecutive bits from the first reference signal sequence, the second reference signal sequence, the third reference signal sequence, and the fourth reference signal sequence, where N is greater than or equal to 1.

With reference to the second possible implementation of the third aspect or the third possible implementation of the third aspect, in a fourth possible implementation of the third aspect, the first processing unit is specifically configured to obtain multiple reference signal sequences, and separately insert the multiple reference signal sequences into the data bit.

With reference to the fourth possible implementation of the third aspect, in a fifth possible implementation of the third aspect, the first processing unit is specifically configured to obtain the pseudo random bit sequence according to an initialization seed, where the initialization seed is an initialization seed that a communications peer end uses in a channel estimation process.

With reference to the second possible implementation of the third aspect, in a sixth possible implementation of the third aspect, the first transceiver unit is further configured to receive an identifier of the reference signal sequence; and the first processing unit is specifically configured to obtain the reference signal sequence identified by the identifier of the reference signal sequence.

With reference to the second possible implementation of the third aspect or the sixth possible implementation of the third aspect, in a seventh possible implementation of the third aspect, the first processing unit is specifically configured to segment the reference signal sequence to obtain multiple reference signal sequence segments, and segment the reference signal sequence to obtain multiple reference signal sequence segments.

According to a fourth aspect, a receive end device is provided, where the device includes:

a second transceiver unit, configured to receive a modulated reference signal sequence; and a second processing unit, configured to demodulate the modulated reference signal sequence to obtain a reference signal sequence, and perform channel estimation by using the reference signal sequence and a local reference signal sequence to obtain channel parameter information, where the local reference signal sequence includes multiple bits and exclusive OR of every two bits separated by one bit in the multiple bits is 1.

With reference to the fourth aspect, in a first possible implementation of the fourth aspect, the local reference signal sequence is at least one of the following sequences: a first reference signal sequence, a second reference signal sequence, a third reference signal sequence, or a fourth reference signal sequence, where the first reference signal sequence is a periodic sequence of a sequence 0, 0, 1, 1, the second reference signal sequence is a periodic sequence of a sequence 0, 1, 1, 0, the third reference signal sequence is a periodic sequence of a sequence 1, 0, 0, 1, and the fourth reference signal sequence is a periodic sequence of a sequence 1, 1, 0, 0.

With reference to the first possible implementation of the fourth aspect, in a second possible implementation of the fourth aspect, the second processing unit is further configured to generate the local reference signal sequence before performing channel estimation by using the reference signal sequence and the local reference signal sequence to obtain the channel parameter information.

With reference to the second possible implementation of the fourth aspect, in a third possible implementation of the fourth aspect, the second processing unit is further configured to generate a pseudo random bit sequence before generating the local reference signal sequence; and the second processing unit is specifically configured to obtain N consecutive bits of the pseudo random bit sequence, and obtain a sequence that is identified by the N consecutive bits from the first reference signal sequence, the second reference signal sequence, the third reference signal sequence, and the fourth reference signal sequence as the local reference signal sequence, where N is greater than or equal to 1.

With reference to the third possible implementation of the fourth aspect, in a fourth possible implementation of the fourth aspect, the second processing unit is further configured to generate a pseudo random bit sequence $C_k$, k≥0 before generating the local reference signal sequence; and the second processing unit is specifically configured to obtain K groups of bits from the pseudo random bit sequence, where each group contains two consecutive bits; and obtain a sequence that is identified by each group of bits among the K groups of bits from the first reference signal sequence, the second reference signal sequence, the third reference signal sequence, and the fourth reference signal sequence as the local reference signal sequence.

With reference to the third possible implementation of the fourth aspect or the fourth possible implementation of the fourth aspect, in a fifth possible implementation of the fourth aspect, the second processing unit is specifically configured to generate the pseudo random bit sequence according to an initialization seed, where the initialization seed is an initialization seed that a communications peer end uses in a GMSK modulation process.

With reference to the first possible implementation of the fourth aspect, in a sixth possible implementation of the fourth aspect, the second transceiver unit is further configured to receive an identifier of a reference signal sequence; and the second processing unit is specifically configured to use a sequence that is identified by the identifier of the reference signal sequence from the first reference signal sequence, the second reference signal sequence, the third reference signal sequence, and the fourth reference signal sequence as the local reference signal sequence.

According to the reference signal sending method, the reference signal receiving method, and the apparatus provided by the embodiments of the present invention, a reference signal sequence is designed as a sequence in which exclusive OR of every two bits separated by one bit is 1, GMSK modulation is performed on the reference signal sequence, and the same reference signal sequence is used to perform channel estimation during GMSK demodulation. Compared with a case in which a pseudo random sequence is used as a pilot symbol, channel estimation accuracy is improved, and channel estimation performance is further improved.

DESCRIPTION OF EMBODIMENTS

Figure 1:
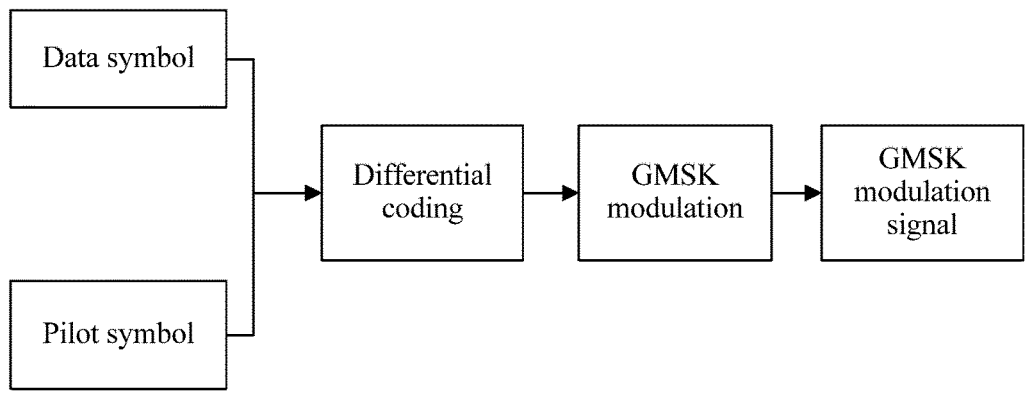
FIG. 1 is a schematic diagram of a sending principle of a GMSK transmitter in the prior art.
Figure 2:
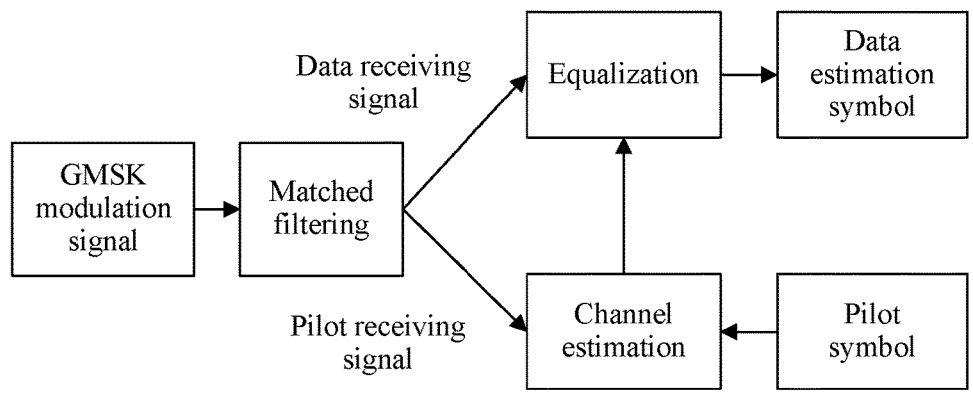
FIG. 2 is a schematic diagram of a receiving principle of a GMSK receiver in the prior art.
Figure 3:
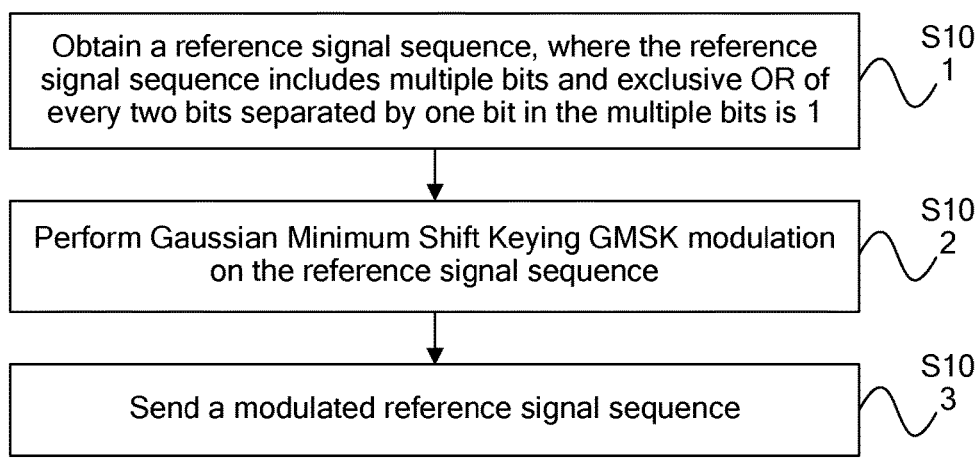
FIG. 3 is a flowchart of a reference signal sending method according to an embodiment of the present invention.
Figure 4:
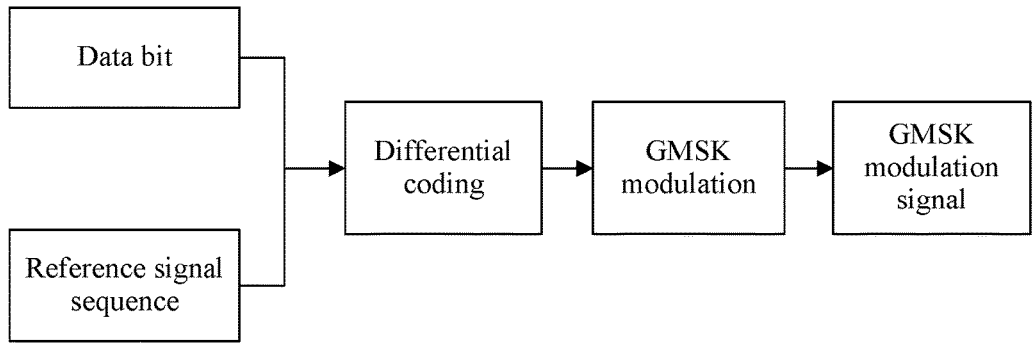
FIG. 4 is a schematic diagram of a sending principle of a transmit end device according to an embodiment of the present invention.

FIG. 3 is a flowchart of a reference signal sending method according to an embodiment of the present invention, and FIG. 4 is a schematic diagram of a sending principle of a transmit end device according to an embodiment of the present invention. In consideration that channel estimation accuracy is affected when a pseudo random sequence is used as a pilot symbol, this embodiment of the present invention provides a reference signal sending method, and specific steps of the method are as follows.

Step S101: Obtain a reference signal sequence, where the reference signal sequence includes multiple bits and exclusive OR of every two bits separated by one bit in the multiple bits is 1.

The reference signal sequence is a sequence $p_i$, $i \geq 0$, including multiple 0 bits and 1 bits, and exclusive OR of every two bits separated by one bit in the sequence $p_i$, $i \geq 0$ is 1, that is, $p_i \oplus p_{i+2}=1$.

The reference signal sequence is at least one of the following sequences: a first reference signal sequence, a second reference signal sequence, a third reference signal sequence, or a fourth reference signal sequence. The first reference signal sequence is a periodic sequence of a sequence 0, 0, 1, 1, the second reference signal sequence is a periodic sequence of a sequence 0, 1, 1, 0, the third reference signal sequence is a periodic sequence of a sequence 1, 0, 0, 1, and the fourth reference signal sequence is a periodic sequence of a sequence 1, 1, 0, 0.

Because exclusive OR of every two bits separated by one bit in the reference signal sequence is 1, four types of reference signal sequences occur and are specifically: the first reference signal sequence Seq1: 0, 0, 1, 1; 0, 0, 1, 1; 0, 0, 1, 1; . . . ; the second reference signal sequence Seq2: 0, 1, 1, 0; 0, 1, 1, 0; 0, 1, 1, 0; . . . ; the third reference signal sequence Seq3: 1, 0, 0, 1; 1, 0, 0, 1; 1, 0, 0, 1; . . . ; and the fourth reference signal sequence Seq4: 1, 1, 0, 0; 1, 1, 0, 0; 1, 1, 0, 0; . . . . The first reference signal sequence is a periodic sequence of the sequence 0, 0, 1, 1, the second reference signal sequence is a periodic sequence of the sequence 0, 1, 1, 0, the third reference signal sequence is a periodic sequence of the sequence 1, 0, 0, 1, and the fourth reference signal sequence is a periodic sequence of the sequence 1, 1, 0, 0.

Step S102: Perform Gaussian Minimum Shift Keying GMSK modulation on the reference signal sequence.

Performing Gaussian Minimum Shift Keying GMSK modulation on the reference signal sequence includes: inserting the reference signal sequence into a data bit; and performing GMSK modulation on the data bit into which the reference signal sequence is inserted.

One sequence is randomly selected from the first reference signal sequence, the second reference signal sequence, the third reference signal sequence, and the fourth reference signal sequence, the selected sequence is segmented into multiple segments, and the multiple segments are separately inserted into the data bit. GMSK modulation is performed on the data bit into which the reference signal sequence is inserted, or the data bit into which the reference signal sequence is inserted is converted into symbols. A specific conversion method is as follows: A bit 0 is mapped to a symbol 1, a bit 1 is mapped to a symbol −1, and GMSK modulation is performed on converted symbols.

Alternatively, one sequence is randomly selected from the first reference signal sequence, the second reference signal sequence, the third reference signal sequence, and the fourth reference signal sequence, and several bits are captured from the selected sequence and are inserted into the data bit. Then another sequence is randomly selected from the first reference signal sequence, the second reference signal sequence, the third reference signal sequence, and the fourth reference signal sequence, and several bits are captured from the selected sequence and are inserted into the data bit, and so on, to obtain the data bit in which the reference signal sequence is inserted. GMSK modulation is performed on the data bit into which the reference signal sequence is inserted, or the data bit into which the reference signal sequence is inserted is converted into symbols. A specific conversion method is as follows: A bit 0 is mapped to a symbol 1, a bit 1 is mapped to a symbol −1, and GMSK modulation is performed on converted symbols.

Step S103: Send a modulated reference signal sequence.

As shown in FIG. 4, a GMSK modulation signal is obtained after Gaussian Minimum Shift Keying GMSK modulation is performed on the reference signal sequence, and a transmit end device sends the GMSK modulation signal to a receive end device.

In this embodiment of the present invention, a reference signal sequence is designed as a sequence in which exclusive OR of every two bits separated by one bit is 1, GMSK modulation is performed on the reference signal sequence, and the same reference signal sequence is used to perform channel estimation during GMSK demodulation. Compared with a case in which a pseudo random sequence is used as a pilot symbol, channel estimation accuracy is improved, and channel estimation performance is further improved.

On the basis of the foregoing embodiment, before the obtaining a reference signal sequence, the method further includes: obtaining a pseudo random bit sequence; and the obtaining a reference signal sequence includes: obtaining N consecutive bits of the pseudo random bit sequence; and obtaining a sequence that is identified by the N consecutive bits from the first reference signal sequence, the second reference signal sequence, the third reference signal sequence, and the fourth reference signal sequence, where N is greater than or equal to 1.

One pseudo random bit sequence is obtained before the reference signal sequence is obtained, and one sequence is selected from the first reference signal sequence, the second reference signal sequence, the third reference signal sequence, and the fourth reference signal sequence according to N consecutive bits of the pseudo random bit sequence. A specific selection method is as follows: The N consecutive bits are used as a sequence identifier, and a reference signal sequence that is identified by the N consecutive bits is determined according to the sequence identifier; or the N consecutive bits of the pseudo random bit sequence are used as N initial bits of the selected reference signal sequence, where N is greater than or equal to 1.

The obtaining a reference signal sequence includes: obtaining multiple reference signal sequences; and the inserting the reference signal sequence into a data bit includes: separately inserting the multiple reference signal sequences into the data bit.

One sequence is randomly selected from the first reference signal sequence, the second reference signal sequence, the third reference signal sequence, and the fourth reference signal sequence, and several bits are captured from the selected sequence and are inserted into the data bit. Then another sequence is randomly selected from the first reference signal sequence, the second reference signal sequence, the third reference signal sequence, and the fourth reference signal sequence, and several bits are captured from the selected sequence and are further inserted into the data bit, and so on, to obtain the data bit in which the reference signal sequence is inserted.

The obtaining a pseudo random bit sequence includes: obtaining the pseudo random bit sequence according to an initialization seed, where the initialization seed is an initialization seed that a communications peer end uses in a channel estimation process.

The pseudo random bit sequence is specifically generated by a pseudo random sequence generator, and an input parameter of the pseudo random sequence generator is the initialization seed. The initialization seed is specifically generated according to a parameter, such as a cell ID or a terminal ID, and the same initialization seed is used by devices that communicate with each other, to generate the same pseudo random bit sequence. The devices that communicate with each other exchange a parameter such as a cell ID or a terminal ID by using signaling.

The data bit includes K groups of segmented data bits. Before the obtaining a reference signal sequence, the method further includes: obtaining a pseudo random bit sequence $C_k$, k≥0. The obtaining a reference signal sequence includes: obtaining K groups of bits from the pseudo random bit sequence, where each group contains two consecutive bits; and obtaining a sequence that is identified by each group of bits among the K groups of bits from the first reference signal sequence, the second reference signal sequence, the third reference signal sequence, and the fourth reference signal sequence. The inserting the reference signal sequence into a data bit includes: respectively inserting L bits of the sequences that are identified by the K groups of bits before the K groups of segmented data bits, after the K groups of segmented data bits, or into the K groups of segmented data bits, where K and L are positive integers.

In this embodiment of the present invention, the data bit includes K groups of segmented data bits. After the pseudo random bit sequence $C_k$, k≥0 is obtained, every two consecutive bits of the pseudo random bit sequence $C_k$, k≥0 is used as one group of bits. For example, $C_0C_1$ is one group of bits, $C_2C_3$ is one group of bits, and $C_kC_{k+1}$ is one group of bits. Each group of bits determines one sequence from the first reference signal sequence, the second reference signal sequence, the third reference signal sequence, and the fourth reference signal sequence. Therefore, K reference signal sequences may be determined by K groups of bits that are obtained from the pseudo random bit sequence. The first L bits of each reference signal sequence are selected, and selected K groups of L bits are respectively inserted before the K groups of segmented data bits, after the K groups of segmented data bits, or into the K groups of segmented data bits, where K and L are positive integers.

A specific process in which each group of bits determines one sequence from the first reference signal sequence, the second reference signal sequence, the third reference signal sequence, and the fourth reference signal sequence is as follows: For example, two bits: a $2k^{th}$ bit $C_{2k}$ and a $(2k+1)^{th}$ bit $C_{2k+1}$ are selected from the pseudo random bit sequence $C_k$, k≥0. If $C_{2k}=0$, $C_{2k+1}=0$, the first reference signal sequence is selected; if $C_{2k}=0$, $C_{2k+1}=1$, the second reference signal sequence is selected; if $C_{2k}=1$, $C_{2k+1}=0$, the third reference signal sequence is selected; and if $C_{2k}=1$, $C_{2k+1}=1$, the fourth reference signal sequence is selected. That is, $$[c_{2k}, c_{2k+1}] = \begin{cases} [0, 0]: Seq1 \\ [0, 1]: Seq2 \\ [1, 0]: Seq3 \\ [1, 1]: Seq4 \end{cases}.$$

Preferably, in this embodiment of the present invention, the first L bits of a sequence determined by $C_0C_1$ are inserted before a $0^{th}$ group of segmented data bits, the first L bits of a sequence determined by $C_2C_3$ are inserted before a first group of segmented data bits, and so on, the first L bits of a sequence determined by $C_{2k}C_{2k+1}$ are inserted before a $K^{th}$ group of segmented data bits, and the first L bits of a sequence determined by $C_{2(K-1)}C_{2K-1}$ are inserted before a $(K-1)^{th}$ group of segmented data bits.

In this embodiment of the present invention, a reference signal sequence is determined according to two neighboring bits of a pseudo random bit sequence. Therefore, a reference signal sequence corresponding to each group of segmented data bits is selected randomly. This avoids an increase in out-of-band power leakage caused by periodicity of the reference signal sequence, and further facilitates interference randomization between neighboring cells.

On the basis of the embodiment corresponding to FIG. 3, before the obtaining a reference signal sequence, the method further includes: receiving an identifier of the reference signal sequence; and the obtaining a reference signal sequence includes: obtaining the reference signal sequence identified by the identifier of the reference signal sequence.

In this embodiment of the present invention, a sequence is obtained according to the identifier of the reference signal sequence from the first reference signal sequence, the second reference signal sequence, the third reference signal sequence, and the fourth reference signal sequence.

The inserting the reference signal sequence into a data bit includes: segmenting the reference signal sequence to obtain multiple reference signal sequence segments; and separately inserting the multiple reference signal sequence segments into the data bit.

The obtained reference signal sequence is segmented into multiple reference signal sequence segments, and the multiple reference signal sequence segments are separately inserted into the data bit.

The data bit includes K groups of segmented data bits. The obtaining a reference signal sequence includes: obtaining any sequence from the first reference signal sequence, the second reference signal sequence, the third reference signal sequence, and the fourth reference signal sequence; and the inserting the reference signal sequence into a data bit includes: dividing the first L*K bits of the obtained sequence into K groups, where each group contains L bits, and respectively inserting the K groups of bits before the K groups of segmented data bits, after the K groups of segmented data bits, or into the K groups of segmented data bits, where K and L are positive integers.

The first L*K bits are obtained from any sequence of the first reference signal sequence, the second reference signal sequence, the third reference signal sequence, and the fourth reference signal sequence. The L*K bits are used as a cascaded pilot bit sequence, and the cascaded pilot bit sequence is specifically expressed as $p_0^{(0)}, p_1^{(0)}, \ldots, p_{L-1}^{(0)}$, $p_0^{(1)}, p_1^{(1)}, \ldots, p_{L-1}^{(1)}, \ldots, p_0^{(K-1)}, p_1^{(K-1)}, \ldots, p_{L-1}^{(K-1)}$. The cascaded pilot bit sequence may be divided into K groups, where each group contains L bits, and the K groups of bits are respectively inserted before the K groups of segmented data bits, after the K groups of segmented data bits, or into the K groups of segmented data bits, where K and L are positive integers. Preferably, in this embodiment of the present invention, $p_0^{(0)}, p_1^{(0)}, \ldots, p_{L-1}^{(0)}$ is inserted before the $0^{th}$ group of segmented data bits, $p_0^{(1)}, p_1^{(1)}, \ldots, p_{L+1}^{(1)}$ is inserted before the first group of segmented data bits, and $p_0^{(K-1)}, p_1^{(K-1)}, \ldots, p_{L-1}^{(K-1)}$ is inserted before the $(K-1)^{th}$ group of segmented data bits.

In this embodiment of the present invention, a reference signal sequence is designed as a sequence in which exclusive OR of every two bits separated by one bit is 1, GMSK modulation is performed on the reference signal sequence, and the same reference signal sequence is used to perform channel estimation during GMSK demodulation. Compared with a case in which a pseudo random sequence is used as a pilot symbol, channel estimation accuracy is improved, and channel estimation performance is further improved.

Figure 5:
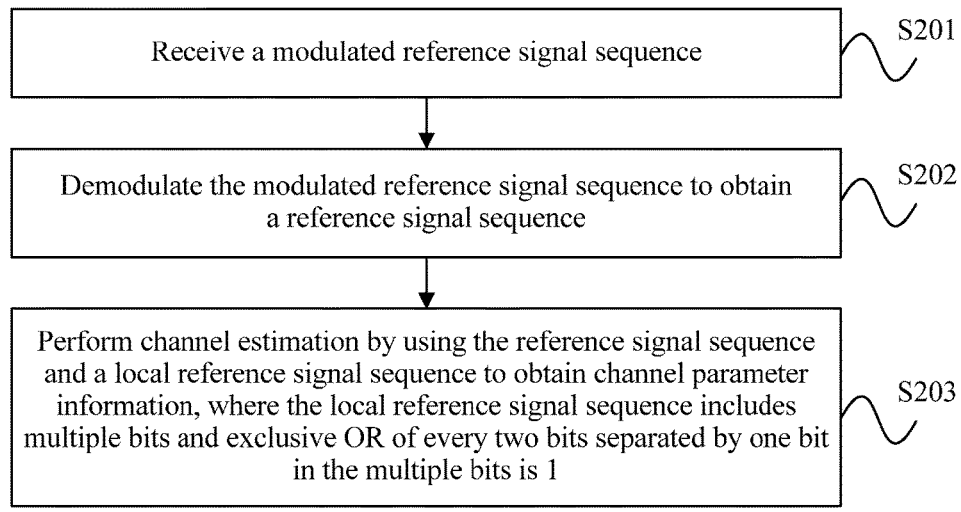
FIG. 5 is a flowchart of a reference signal receiving method according to an embodiment of the present invention.
Figure 6:
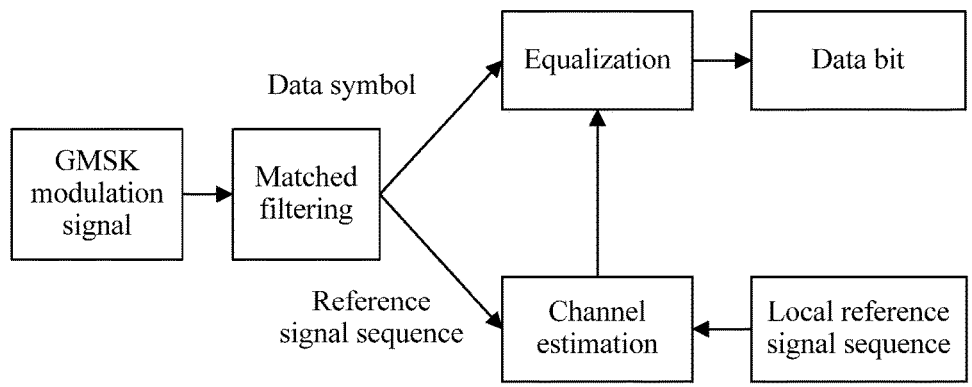
FIG. 6 is a schematic diagram of a receiving principle of a receive end device according to an embodiment of the present invention.

FIG. 5 is a flowchart of a reference signal receiving method according to an embodiment of the present invention, and FIG. 6 is a schematic diagram of a receiving principle of a receive end device according to an embodiment of the present invention. In consideration that channel estimation accuracy is affected when a pseudo random sequence is used as a pilot symbol, this embodiment of the present invention provides a reference signal receiving method, and specific steps of the method are as follows:

Step S201: Receive a modulated reference signal sequence.

As shown in FIG. 6, the receive end device receives a GMSK modulation signal sent by a transmit end device.

Step S202: Demodulate the modulated reference signal sequence to obtain a reference signal sequence.

The receive end device performs matched filtering on the GMSK modulation signal to obtain a data symbol and the reference signal sequence. If the data bit into which the reference signal sequence is inserted is converted into symbols in the foregoing step S102, and a specific conversion method is as follows: A bit 0 is mapped to a symbol 1, a bit 1 is mapped to a symbol −1, and GMSK modulation is performed on converted symbols, every two bits separated by one bit in multiple bits included in the reference signal sequence obtained after demodulation in step S202 are opposite numbers.

Step S203: Perform channel estimation by using the reference signal sequence and a local reference signal sequence to obtain channel parameter information, where the local reference signal sequence includes multiple bits and exclusive OR of every two bits separated by one bit in the multiple bits is 1.

The receive end device stores the local reference signal sequence in advance, or the receive end device generates the local reference signal sequence before performing step S201 or step S202, or the receive end device generates the local reference signal sequence when performing step S201 or step S202. The local reference signal sequence includes multiple bits and exclusive OR of every two bits separated by one bit in the multiple bits is 1. On the basis of the principle shown in FIG. 6, in this embodiment of the present invention, Laurent decomposition is performed on the local reference signal sequence, so that every two bits separated by one bit in the multiple bits included in the local reference signal sequence are opposite numbers. Channel estimation is performed by using the reference signal sequence obtained in step S202 and the local reference signal sequence on which Laurent decomposition is performed in step S203, to obtain the channel parameter information.

In this embodiment of the present invention, a reference signal sequence is designed as a sequence in which exclusive OR of every two bits separated by one bit is 1, GMSK modulation is performed on the reference signal sequence, and the same reference signal sequence is used to perform channel estimation during GMSK demodulation. Compared with a case in which a pseudo random sequence is used as a pilot symbol, channel estimation accuracy is improved, and channel estimation performance is further improved.

On the basis of the foregoing embodiment, the local reference signal sequence is at least one of the following sequences: a first reference signal sequence, a second reference signal sequence, a third reference signal sequence, or a fourth reference signal sequence. The first reference signal sequence is a periodic sequence of a sequence 0, 0, 1, 1, the second reference signal sequence is a periodic sequence of a sequence 0, 1, 1, 0, the third reference signal sequence is a periodic sequence of a sequence 1, 0, 0, 1, and the fourth reference signal sequence is a periodic sequence of a sequence 1, 1, 0, 0.

Before the performing channel estimation by using the reference signal sequence and a local reference signal sequence to obtain channel parameter information, the method further includes: generating the local reference signal sequence.

A generation rule of the local reference signal sequence corresponding to the receive end device is consistent with a generation rule of the reference signal sequence corresponding to the transmit end device.

Before the generating the local reference signal sequence, the method further includes: generating a pseudo random bit sequence; and the generating the local reference signal sequence includes: obtaining N consecutive bits of the pseudo random bit sequence, and obtaining a sequence that is identified by the N consecutive bits from the first reference signal sequence, the second reference signal sequence, the third reference signal sequence, and the fourth reference signal sequence as the local reference signal sequence, where N is greater than or equal to 1.

One sequence is selected from the first reference signal sequence, the second reference signal sequence, the third reference signal sequence, and the fourth reference signal sequence according to the N consecutive bits of the pseudo random bit sequence. A specific selection method is as follows: The N consecutive bits are used as a sequence identifier, and a reference signal sequence that is identified by the N consecutive bits is determined according to the sequence identifier; or the N consecutive bits of the pseudo random bit sequence are used as N initial bits of the selected reference signal sequence, where N is greater than or equal to 1.

Before the generating the local reference signal sequence, the method further includes: generating a pseudo random bit sequence $C_k$, k≥0; and the generating the local reference signal sequence includes: obtaining K groups of bits from the pseudo random bit sequence, where each group contains two consecutive bits, and obtaining a sequence that is identified by each group of bits among the K groups of bits from the first reference signal sequence, the second reference signal sequence, the third reference signal sequence, and the fourth reference signal sequence as the local reference signal sequence.

Every two consecutive bits of the pseudo random bit sequence $C_k$, k≥0 is used as one group of bits. For example, $C_0C_1$ is one group of bits, $C_2C_3$ is one group of bits, and $C_kC_{k+1}$ is one group of bits. Each group of bits determines one sequence from the first reference signal sequence, the second reference signal sequence, the third reference signal sequence, and the fourth reference signal sequence. For example, two bits: a $2k^{th}$ bit $C_{2k}$ and a $(2k+1)^{th}$ bit $C_{2k+1}$ are selected from the pseudo random bit sequence $C_k$, k≥0. If $C_{2k}=0$, $C_{2k+1}=0$, the first reference signal sequence is selected as the local reference signal sequence; if $C_{2k}=0$, $C_{2k+1}=1$, the second reference signal sequence is selected as the local reference signal sequence; if $C_{2k}=1$, $C_{2k+1}=0$, the third reference signal sequence is selected as the local reference signal sequence, and if $C_{2k}=1$, $C_{2k+1}=1$, the fourth reference signal sequence is selected as the local reference signal sequence. That is, $$[c_{2k}, c_{2k+1}] = \begin{cases} [0, 0]: Seq1 \\ [0, 1]: Seq2 \\ [1, 0]: Seq3 \\ [1, 1]: Seq4 \end{cases}.$$

The generating a pseudo random bit sequence includes: generating the pseudo random bit sequence according to an initialization seed, where the initialization seed is an initialization seed that a communications peer end uses in a GMSK modulation process.

The pseudo random bit sequence is specifically generated by a pseudo random sequence generator, and an input parameter of the pseudo random sequence generator is the initialization seed. The initialization seed is specifically generated according to a parameter, such as a cell ID or a terminal ID, and the same initialization seed is used by devices that communicate with each other, to generate the same pseudo random bit sequence. The devices that communicate with each other exchange a parameter such as a cell ID or a terminal ID by using signaling.

In this embodiment of the present invention, a reference signal sequence is determined according to two neighboring bits of a pseudo random bit sequence. Therefore, a reference signal sequence corresponding to each group of segmented data bits is selected randomly. This avoids an increase in out-of-band power leakage caused by periodicity of the reference signal sequence, and further facilitates interference randomization between neighboring cells.

On the basis of the embodiment corresponding to FIG. 5, the method further includes: receiving an identifier of a reference signal sequence; and selecting a sequence that is identified by the identifier of the reference signal sequence from the first reference signal sequence, the second reference signal sequence, the third reference signal sequence, and the fourth reference signal sequence as the local reference signal sequence.

The transmit end device randomly selects one sequence from the first reference signal sequence, the second reference signal sequence, the third reference signal sequence, and the fourth reference signal sequence, and then sends an identifier of the sequence to the receive end device. The receive end device selects a sequence from the first reference signal sequence, the second reference signal sequence, the third reference signal sequence, and the fourth reference signal sequence according to the identifier of the sequence, so that the sequence selected by the receive end device is the same as the reference signal sequence selected by the transmit end device.

As shown in FIG. 6, equalization processing is performed according to the data symbols and the channel parameter information to restore the data bit.

In this embodiment of the present invention, a reference signal sequence is designed as a sequence in which exclusive OR of every two bits separated by one bit is 1, GMSK modulation is performed on the reference signal sequence, and the same reference signal sequence is used to perform channel estimation during GMSK demodulation. Compared with a case in which a pseudo random sequence is used as a pilot symbol, channel estimation accuracy is improved, and channel estimation performance is further improved.

Figure 7:
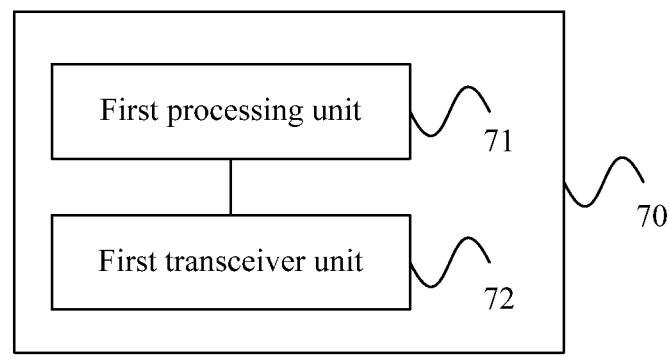
FIG. 7 is a structural diagram of a transmit end device according to an embodiment of the present invention.

FIG. 7 is a structural diagram of a transmit end device according to an embodiment of the present invention. The transmit end device provided in this embodiment of the present invention may perform a processing process provided by a reference signal sending method embodiment. As shown in FIG. 7, a transmit end device 70 includes a first processing unit 71 and a first transceiver unit 72. The first processing unit 71 is configured to obtain a reference signal sequence, where the reference signal sequence includes multiple bits and exclusive OR of every two bits separated by one bit in the multiple bits is 1, and perform Gaussian Minimum Shift Keying GMSK modulation on the reference signal sequence. The first transceiver unit 72 is configured to send a modulated reference signal sequence.

In this embodiment of the present invention, the first processing unit 71 may be implemented by a processor.

In this embodiment of the present invention, a reference signal sequence is designed as a sequence in which exclusive OR of every two bits separated by one bit is 1, GMSK modulation is performed on the reference signal sequence, and the same reference signal sequence is used to perform channel estimation during GMSK demodulation. Compared with a case in which a pseudo random sequence is used as a pilot symbol, channel estimation accuracy is improved, and channel estimation performance is further improved.

On the basis of the foregoing embodiment, the reference signal sequence is at least one of the following sequences: a first reference signal sequence, a second reference signal sequence, a third reference signal sequence, or a fourth reference signal sequence. The first reference signal sequence is a periodic sequence of a sequence 0, 0, 1, 1, the second reference signal sequence is a periodic sequence of a sequence 0, 1, 1, 0, the third reference signal sequence is a periodic sequence of a sequence 1, 0, 0, 1, and the fourth reference signal sequence is a periodic sequence of a sequence 1, 1, 0, 0.

The first processing unit 71 is specifically configured to insert the reference signal sequence into a data bit, and perform GMSK modulation on the data bit into which the reference signal sequence is inserted.

The first processing unit 71 is further configured to obtain a pseudo random bit sequence, obtain N consecutive bits of the pseudo random bit sequence, and obtain a sequence that is identified by the N consecutive bits from the first reference signal sequence, the second reference signal sequence, the third reference signal sequence, and the fourth reference signal sequence, where N is greater than or equal to 1.

The first processing unit 71 is specifically configured to obtain multiple reference signal sequences, and separately insert the multiple reference signal sequences into the data bit.

The first processing unit 71 is specifically configured to obtain the pseudo random bit sequence according to an initialization seed, where the initialization seed is an initialization seed that a communications peer end uses in a channel estimation process.

The first transceiver unit 72 is further configured to receive an identifier of the reference signal sequence. The first processing unit 71 is specifically configured to obtain the reference signal sequence identified by the identifier of the reference signal sequence.

The first processing unit 71 is specifically configured to segment the reference signal sequence to obtain multiple reference signal sequence segments, and segment the reference signal sequence to obtain multiple reference signal sequence segments.

In this embodiment of the present invention, the first processing unit 71 may be implemented by a processor.

The transmit end device provided in this embodiment of the present invention may be specifically configured to perform the method embodiment provided by FIG. 3, and a specific function is not described herein.

In this embodiment of the present invention, a reference signal sequence is determined according to two neighboring bits of a pseudo random bit sequence.

Therefore, a reference signal sequence corresponding to each group of segmented data bits is selected randomly. This avoids an increase in out-of-band power leakage caused by periodicity of the reference signal sequence, and further facilitates interference randomization between neighboring cells.

Figure 8:
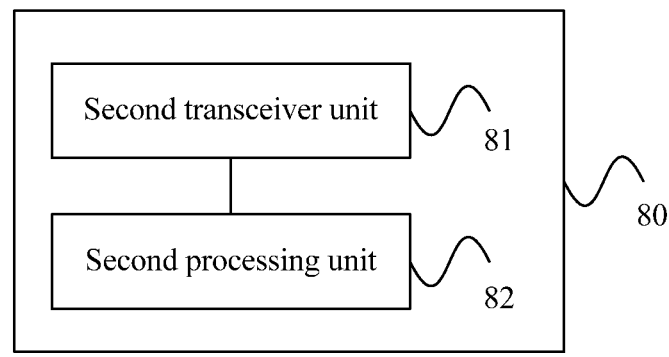
FIG. 8 is a structural diagram of a receive end device according to an embodiment of the present invention.

FIG. 8 is a structural diagram of a receive end device according to an embodiment of the present invention. The receive end device provided in this embodiment of the present invention may perform a processing process provided by a reference signal receiving method embodiment. As shown in FIG. 8, a receive end device 80 includes a second transceiver unit 81 and a second processing unit 82. The second transceiver unit 81 is configured to receive a modulated reference signal sequence; and the second processing unit 82 is configured to demodulate the modulated reference signal sequence to obtain a reference signal sequence, and perform channel estimation by using the reference signal sequence and a local reference signal sequence to obtain channel parameter information, where the local reference signal sequence includes multiple bits, and exclusive OR of every two bits separated by one bit in the multiple bits is 1.

In this embodiment of the present invention, the second processing unit 82 may be implemented by a processor.

In this embodiment of the present invention, a reference signal sequence is designed as a sequence in which exclusive OR of every two bits separated by one bit is 1, GMSK modulation is performed on the reference signal sequence, and the same reference signal sequence is used to perform channel estimation during GMSK demodulation. Compared with a case in which a pseudo random sequence is used as a pilot symbol, channel estimation accuracy is improved, and channel estimation performance is further improved.

On the basis of the foregoing embodiment, the local reference signal sequence is at least one of the following sequences: a first reference signal sequence, a second reference signal sequence, a third reference signal sequence, or a fourth reference signal sequence. The first reference signal sequence is a periodic sequence of a sequence 0, 0, 1, 1, the second reference signal sequence is a periodic sequence of a sequence 0, 1, 1, 0, the third reference signal sequence is a periodic sequence of a sequence 1, 0, 0, 1, and the fourth reference signal sequence is a periodic sequence of a sequence 1, 1, 0, 0.

The second processing unit 82 is further configured to generate the local reference signal sequence before performing channel estimation by using the reference signal sequence and the local reference signal sequence to obtain the channel parameter information.

The second processing unit 82 is further configured to generate the local reference signal sequence before performing channel estimation by using the reference signal sequence and the local reference signal sequence to obtain the channel parameter information. The second processing unit 82 is specifically configured to obtain N consecutive bits of the pseudo random bit sequence, and obtain a sequence that is identified by the N consecutive bits from the first reference signal sequence, the second reference signal sequence, the third reference signal sequence, and the fourth reference signal sequence as the local reference signal sequence, where N is greater than or equal to 1.

The second processing unit 82 is further configured to generate a pseudo random bit sequence $C_k$, k≥0 before generating the local reference signal sequence. The second processing unit 82 is specifically configured to obtain K groups of bits from the pseudo random bit sequence, where each group contains two consecutive bits; and obtain a sequence that is identified by each group of bits among the K groups of bits from the first reference signal sequence, the second reference signal sequence, the third reference signal sequence, and the fourth reference signal sequence as the local reference signal sequence.

The second processing unit 82 is specifically configured to generate the pseudo random bit sequence according to an initialization seed, where the initialization seed is an initialization seed that a communications peer end uses in a GMSK modulation process.

The second transceiver unit 81 is further configured to receive an identifier of a reference signal sequence. The second processing unit 82 is specifically configured to use a sequence that is identified by the identifier of the reference signal sequence from the first reference signal sequence, the second reference signal sequence, the third reference signal sequence, and the fourth reference signal sequence as the local reference signal sequence.

In this embodiment of the present invention, the second processing unit 82 may be implemented by a processor.

The receive end device provided in this embodiment of the present invention may be specifically configured to perform the method embodiment provided by FIG. 5, and a specific function is not described herein.

In this embodiment of the present invention, a reference signal sequence is determined according to two neighboring bits of a pseudo random bit sequence. Therefore, a reference signal sequence corresponding to each group of segmented data bits is selected randomly. This avoids an increase in out-of-band power leakage caused by periodicity of the reference signal sequence, and further facilitates interference randomization between neighboring cells.

Figure 9:
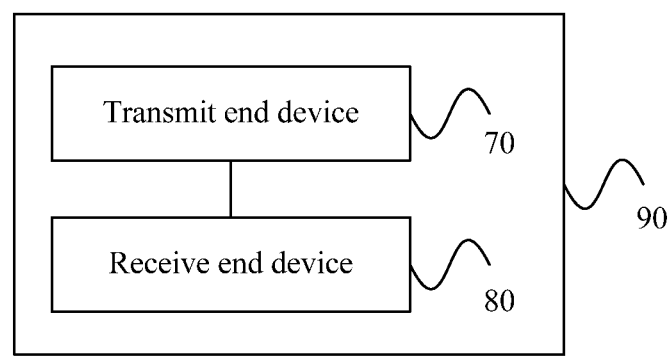
FIG. 9 is a structural diagram of a reference signal sending and receiving system according to an embodiment of the present invention.

FIG. 9 is a structural diagram of a reference signal sending and receiving system according to an embodiment of the present invention. The reference signal sending and receiving system provided in this embodiment of the present invention may perform a processing process provided by a reference signal sending method embodiment and a reference signal receiving method embodiment. As shown in FIG. 9, a reference signal sending and receiving system 90 includes the transmit end device 70 of the foregoing embodiment and the receive end device 80 of the foregoing embodiment.

The reference signal sending and receiving system provided in this embodiment of the present invention may perform the processing process provided by the reference signal sending method embodiment and the reference signal receiving method embodiment.

In conclusion, in this embodiment of the present invention, a reference signal sequence is designed as a sequence in which exclusive OR of every two bits separated by one bit is 1, GMSK modulation is performed on the reference signal sequence, and the same reference signal sequence is used to perform channel estimation during GMSK demodulation. Compared with a case in which a pseudo random sequence is used as a pilot symbol, channel estimation accuracy is improved, and channel estimation performance is further improved. A reference signal sequence is determined according to two neighboring bits of a pseudo random bit sequence. Therefore, a reference signal sequence corresponding to each group of segmented data bits is selected randomly. This avoids an increase in out-of-band power leakage caused by periodicity of the reference signal sequence, and further facilitates interference randomization between neighboring cells.

In several embodiments provided in the present invention, it should be understood that disclosed apparatus and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve objectives of solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The foregoing software functional unit is stored in a storage medium and includes several instructions for instructing a computer device (which may be a personal computer, a server, or a network device) or a processor (processor) to perform a part of steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein.

Finally, it should be noted that: the foregoing embodiments are merely intended for describing the technical solutions of the present invention other than limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method of sending a reference signal comprising:
   obtaining a pseudo random bit sequence;
   obtaining a reference signal sequence comprising multiple bits and exclusive OR of every two bits separated by one bit in the multiple bits is 1, the obtaining a reference signal sequence comprising:
      obtaining N consecutive bits of the pseudo random bit sequence; and
      obtaining a sequence that is identified by the N consecutive bits from a first reference signal sequence, a second reference signal sequence, a third reference signal sequence, and a fourth reference signal sequence, wherein N is greater than or equal to 1;
   performing Gaussian Minimum Shift Keying (GMSK) modulation on the reference signal sequence; and
   sending a modulated reference signal sequence.

2. The method according to claim 1, wherein the reference signal sequence is at least one of: the first reference signal sequence, the second reference signal sequence, the third reference signal sequence, or the fourth reference signal sequence, wherein
   the first reference signal sequence is a periodic sequence of a sequence 0, 0, 1, 1, the second reference signal sequence is a periodic sequence of a sequence 0, 1, 1, 0, the third reference signal sequence is a periodic sequence of a sequence 1, 0, 0, 1, and the fourth reference signal sequence is a periodic sequence of a sequence 1, 1, 0, 0.

3. The method according to claim 2, wherein the performing Gaussian Minimum Shift Keying GMSK modulation on the reference signal sequence comprises:
   inserting the reference signal sequence into a data bit; and
   performing GMSK modulation on the data bit into which the reference signal sequence is inserted.

4. The method according to claim 3, wherein
   the obtaining a reference signal sequence comprises: obtaining multiple reference signal sequences; and
   the inserting the reference signal sequence into a data bit comprises: separately inserting the multiple reference signal sequences into the data bit.

5. The method according to claim 4, wherein the obtaining a pseudo random bit sequence comprises:
   obtaining the pseudo random bit sequence according to an initialization seed, wherein the initialization seed is an initialization seed that a communications peer end uses in a channel estimation process.

6. The method according to claim 3, wherein before the obtaining a reference signal sequence, the method further comprises: receiving an identifier of the reference signal sequence; and
   the obtaining a reference signal sequence comprises:
      obtaining the reference signal sequence identified by the identifier of the reference signal sequence.

7. The method according to claim 3, wherein the inserting the reference signal sequence into a data bit comprises:
   segmenting the reference signal sequence to obtain multiple reference signal sequence segments; and
   separately inserting the multiple reference signal sequence segments into the data bit.

8. A transmit end device comprising:
a processor, configured to obtain a pseudo random bit sequence, obtain a reference signal sequence comprising multiple bits and exclusive OR of every two bits separated by one bit in the multiple bits is 1, obtain N consecutive bits of the pseudo random bit sequence, obtain a sequence that is identified by the N consecutive bits from a first reference signal sequence, a second reference signal sequence, a third reference signal sequence, and a fourth reference signal sequence, wherein N is greater than or equal to 1, and perform Gaussian Minimum Shift Keying (GMSK) modulation on the reference signal sequence; and
a transceiver, configured to send a modulated reference signal sequence.

9. The transmit end device according to claim 8, wherein the reference signal sequence is at least one of: the first reference signal sequence, the second reference signal sequence, the third reference signal sequence, or the fourth reference signal sequence, wherein
the first reference signal sequence is a periodic sequence of a sequence 0, 0, 1, 1, the second reference signal sequence is a periodic sequence of a sequence 0, 1, 1, 0, the third reference signal sequence is a periodic sequence of a sequence 1, 0, 0, 1, and the fourth reference signal sequence is a periodic sequence of a sequence 1, 1, 0, 0.

10. The transmit end device according to claim 9, wherein the processor is configured to insert the reference signal sequence into a data bit, and perform GMSK modulation on the data bit into which the reference signal sequence is inserted.

11. The transmit end device according to claim 10, wherein the processor is configured to obtain multiple reference signal sequences, and separately insert the multiple reference signal sequences into the data bit.

12. The transmit end device according to claim 11, wherein the processor is configured to obtain the pseudo random bit sequence according to an initialization seed, wherein the initialization seed is an initialization seed that a communications peer end uses in a channel estimation process.

13. The transmit end device according to claim 10, wherein the transceiver is further configured to receive an identifier of the reference signal sequence; and
the processor is configured to obtain the reference signal sequence identified by the identifier of the reference signal sequence.

14. The transmit end device according to claim 10, wherein the processor is configured to segment the reference signal sequence to obtain multiple reference signal sequence segments, and segment the reference signal sequence to obtain multiple reference signal sequence segments.

15. A device, comprising:
a processor; and
a non-transitory computer-readable storage medium coupled to the processor and storing programming instructions for execution by the processor, the programming instructions instructing the processor to configure the device to:
obtain a pseudo random bit sequence;
obtain a reference signal sequence comprising multiple bits and exclusive OR of every two bits separated by one bit in the multiple bits is 1, the obtaining a reference signal sequence comprising:
obtain N consecutive bits of the pseudo random bit sequence; and
obtain a sequence that is identified by the N consecutive bits from a first reference signal sequence, a second reference signal sequence, a third reference signal sequence, and a fourth reference signal sequence, wherein N is greater than or equal to 1;
perform Gaussian Minimum Shift Keying (GMSK) modulation on the reference signal sequence; and
send a modulated reference signal sequence.

16. The device according to claim 15, wherein the reference signal sequence is at least one of: the first reference signal sequence, the second reference signal sequence, the third reference signal sequence, or the fourth reference signal sequence, wherein
the first reference signal sequence is a periodic sequence of a sequence 0, 0, 1, 1, the second reference signal sequence is a periodic sequence of a sequence 0, 1, 1, 0, the third reference signal sequence is a periodic sequence of a sequence 1, 0, 0, 1, and the fourth reference signal sequence is a periodic sequence of a sequence 1, 1, 0, 0.

17. The device according to claim 16, wherein the programming instructions further instruct the processor to configure the device to:
insert the reference signal sequence into a data bit; and
perform GMSK modulation on the data bit into which the reference signal sequence is inserted.

* * * * *